United States Patent
Parra et al.

(10) Patent No.: US 12,495,361 B2
(45) Date of Patent: *Dec. 9, 2025

(54) MODIFYING IDLE MODE DRX ON WIRELESS DEVICES

(71) Applicants: AT&T Intellectual Property I, L.P., Atlanta, GA (US); AT&T Mobility II LLC, Atlanta, GA (US)

(72) Inventors: Darwin Parra, Cedar Park, TX (US); Robert Holden, Allen, TX (US); Stephen Hardin, Suwanee, GA (US); Jason Sikes, Carnation, WA (US); Tracey Green, Louisville, KY (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 357 days.

This patent is subject to a terminal disclaimer.

(21) Appl. No.: 18/298,682

(22) Filed: Apr. 11, 2023

(65) Prior Publication Data
US 2023/0247556 A1   Aug. 3, 2023

Related U.S. Application Data

(63) Continuation of application No. 17/315,502, filed on May 10, 2021, now Pat. No. 11,653,307.

(51) Int. Cl.
*H04W 52/02*   (2009.01)
*H04W 76/28*   (2018.01)

(52) U.S. Cl.
CPC ....... *H04W 52/0235* (2013.01); *H04W 76/28* (2018.02)

(58) Field of Classification Search
CPC .......................... H04W 52/0235; H04W 76/28
USPC ........................................................... 370/311
See application file for complete search history.

(56) References Cited

U.S. PATENT DOCUMENTS

| | | | |
|---|---|---|---|
| 8,527,006 B2 | 9/2013 | Tat et al. | |
| 9,948,336 B2 | 4/2018 | Nam et al. | |
| 2009/0258661 A1* | 10/2009 | Tsai | H04W 68/025 455/458 |
| 2018/0115522 A1 | 4/2018 | Gleichauf | |
| 2018/0146430 A1* | 5/2018 | Yadav | H04W 52/0241 |
| 2020/0163017 A1 | 5/2020 | Priyanto et al. | |
| 2022/0361106 A1 | 11/2022 | Parra et al. | |

FOREIGN PATENT DOCUMENTS

WO   WO-2021096203 A1 *   5/2021   ............. B60R 16/03

* cited by examiner

*Primary Examiner* — Intekhaab A Siddiquee
(74) *Attorney, Agent, or Firm* — Guntin & Gust, PLC; Robert Gingher

(57) ABSTRACT

Systems and methods may provide for deactivating the Idle mode discontinuous reception (iDRX) for services that require latency that is less than the conventional paging channel values.

20 Claims, 5 Drawing Sheets

MODIFYING IDLE MODE DRX ON WIRELESS DEVICES

CROSS-REFERENCE TO RELATED APPLICATION

This application claims priority to and is a continuation of U.S. application Ser. No. 17/315,502, filed May 10, 2021. All sections of the aforementioned application(s) and/or patent(s) are incorporated herein by reference in their entirety.

TECHNICAL FIELD

This disclosure is directed to systems and methods for operating a network device, and more particularly, to dynamically deactivating discontinuous reception (DRX) on select devices that have low latency requirements.

BACKGROUND

Discontinuous Reception (DRX) is designed to save battery life for user equipment (UE). If DRX is not enabled, the UE must be awake and ready to receive and decode downlink data because of the uncertainty associated with the timing of the reception of such downlink data. This means that the UE has to be monitoring the physical downlink control channel (PDCCH) in every subframe in order to check if there is downlink data available. This consumes the UE's power. DRX in LTE improves UE battery lifetime. In DRX, UE discontinuously receives PDCCH.

This background information is provided to reveal information believed by the applicant to be of possible relevance. No admission is necessarily intended, nor should be construed, that any of the preceding information constitutes prior art.

SUMMARY

Disclosed herein are systems and methods that provide for deactivating the idle mode DRX for services that require latency that is less than the conventional paging channel values. In an example, an apparatus may include a processor and a memory coupled with the processor that effectuates operations. The operations may include communicating, by an end device (e.g., user equipment), with a communications network; based on the communication, receiving, by the end device, a message; determining, by the end device, that an idle mode discontinuous reception indicator is indicated as activate on the end device; and based on a comparison of the message and the idle mode discontinuous reception indicator being activated, updating the idle mode discontinuous reception indicator to inactive on the end device.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION OF ILLUSTRATIVE EMBODIMENTS

Idle mode discontinuous reception (iDRX) is a technique that reduces power consumption in battery-operated user equipment (UE) attached to wireless networks (e.g., LTE) that works by scheduling UEs to tune to the network paging channels periodically looking for incoming messaging, and turn off the receiver(s) in between these periods. The support of the iDRX feature is signaled to the network by the UE via Feature Group Indicator (FGI) bits that are sent on the RRC UE Capability Message exchange. The FGIs have a binary state: the feature is supported or not. The iDRX is controlled by the network scheduler that determines how often the receiver should tune to the paging channel and for how long. For example, in some network these values are around every 1300 milliseconds for when to tune to the paging channel and 8 milliseconds for how long the UE should be tuned to the paging channel. Disclosed herein are systems and methods that provide for deactivating the iDRX for services that require latency that is less than the conventional paging channel values.

Figure 1:
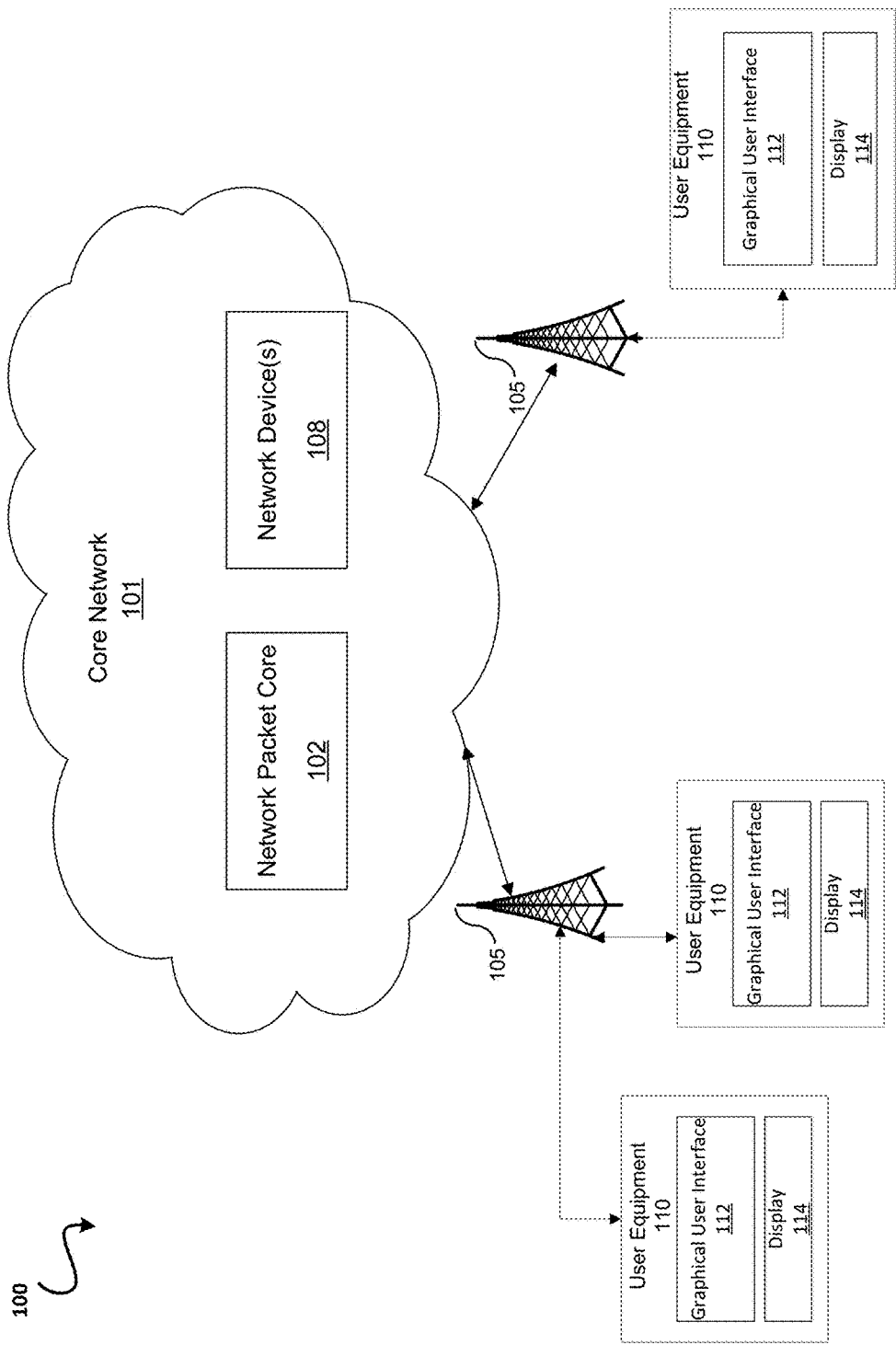
FIG. 1 illustrates an exemplary operating environment of the present disclosure.

FIG. 1 illustrates an example telecommunication system 100 that may be utilized to dynamically deactivate discontinuous reception (DRX) on select devices that have low latency requirements according to an exemplary systems and methods disclosed herein. The telecommunication system 100 may include a core network 101, a packet core network 102, a network device(s) 108, network node 105, and user equipment (UE) 110. UE 110 may request a service, execute an application, perform an operation, provide telephony services, messaging services, video services, or the like. UE 110 may include any appropriate type of user equipment, such as a tablet, personal computer, a laptop computer, a wearable device, a virtual reality (VR) device, a heads-up display (HUD) device, a mobile phone, or the like. The UE 110 may include a display 114 and a graphical user interface 112.

The UE 110 may be configured with machine type communication or machine to machine (M2M) capabilities. The UE 110 may also include metering devices, implantable medical device (IMDs), sensor or control devices associated with home automation systems, tracking devices, point of sale devices (e.g., vending, machines), security devices (e.g., associated with surveillance systems, homes security, access control, etc.), or the like.

UE 110 may gain access to the core network 101 via any appropriate mechanism. For example, as depicted in FIG. 1, access to the core network 101 may be provided via the packet core 102, network device(s) 108, and network node 105 (e.g., NodeB devices, base station (BS) devices, access point (AP) devices, or radio access network (RAN) devices) using a variety of radio access technologies (e.g., LTE RAN, 5G RAN, etc.), Wi-Fi infrastructure, hot spots, or the like, or any appropriate combination thereof. The packet core 102 may be for example, an Evolved Packet Core or Common BackBone (CBB).

A communication link may be established between the UE 110 and the network node 105 of the wireless communication network. For example, uplink communications from the UE 110 to the network node 105 may occur or downlink communications from the network node 105 to the UE 110 may occur. A communication link may also be established between the network node 105 and the core network 101 (or one or more network devices 108 of the core network 101) via, for example, one or more backhaul links. For example, uplink communications from the UE 110 to the network node 105 and downlink communications from the network node 105 to the UE 110 may occur.

The core network 101 may utilize various network devices 108 in order to facilitate providing wireless communication services to the UEs 110 via the network nodes 105. For example, the one or more network devices 108 may be, for example, mobile switching center (MSCs) devices, a home location register (HLR) device, a visitor location register (VLR) device, authentication center (AUC) devices, provisioning servers, billing servers, operation and support system (OSS) devices, short message service center (SMSC) devices, mobility management entity (MME) devices, and many other elements. For example, an MME may be involved in the bearer activation/deactivation process or may be responsible for choosing the serving gateway (SGW) for a UE at an initial attach. The MME may also be used for idle mode UE paging and tagging procedure including retransmissions.

Idle mode discontinuous reception (iDRX) is a UE mode that may be used to reduce power consumption in UE 110 attached to the core network 101 by operating in the power saving mode (PSM). This UE mode is a mode in which the UE 110 alternates between activating and deactivating a receiver of the UE 110. During idle mode, the UE 110 listens for paging messages or messages sent via downlink control channels used by the core network 101 to reach the UE 110. The duration of time associated with each receiver activation/deactivation event is referred to as the DRX period or cycle (e.g., 1250 ms). The DRX period or cycle may be used for low latency mobile terminated services that should reach the UE 110 within the DRX period or cycle. The duration of the idle mode may be controlled by a timer. The iDRX may be controlled by a network scheduler that may be used to determine how often a receiver of the UE 110 should tune to a paging channel and for how long.

Operating in a power saving mode may allow the UE 110 to "sleep" in order to conserve power by deactivating its transmitter and receiver, thus operating in an unreachable state. A MME may also be configured to control a PSM parameter negotiation between the UE 110 and the core network 101.

The capability information message may include a feature group indicator (FGI). The FGI is a special information element (IE) within UE capability information message. The FGI may provide information about radio protocol aspects. FGI information may be used by the MME prior to setting up any procedure for a specific UE 110. The FGI information allows the MME to avoid directing the UE 110 from doing something not supported by the UE 110. Accordingly, support of a DRX feature may be signaled to the MME by the UE 110 via FGI bits that may be sent on a Radio Resource Control (RRC) UE capability information message exchange having a binary state (e.g., the feature is supported or not). For example, the MME or network node 105 may include a control mechanism that may use a secure light weight machine to machine (LWM2M) framework to communicate a FGI value change to a target UE 110 or group of UEs 110 via an application processor. The UE 110 application processor may issue an AT command, API call or machine interface command to change designated FGI bits in a baseband. The UE 110 application processor may also write a new FGI configuration to memory and trigger a modem reset to cause the UE 110 to attach to the core network 101 with a new iDRX capability. Reset may happen because every time something is changed in LWM2M it will be stored in memory and will trigger the reset for the changes to take effect. After the reset procedure, the UE 110 may monitor paging channels continuously and respond to incoming paging.

The LWM2M may be used to define a new object (e.g., a "DRX activation bit") that may be set to a default value (e.g., 1 (active)). The MME may query a status of the DRX activation bit in response to a bootup by the baseband. The query may be used to determine whether a reset procedure should occur or whether a bootup that is in process should continue. Here we may use an upper layer communication (e.g., an application layer) for a device to change its settings. So we may use the application layer to change the behavior of the radio. Conventionally, each UE would need to be configured in a substantially manual process in order to change the DRX setting. The disclosed method provides for new settings on thousands of devices remotely. Contrary to the disclosed methods, other conventional ways to change DRX may require complex and expensive software changes to not just the modem but other software connected for an entire device or system.

Figure 2:
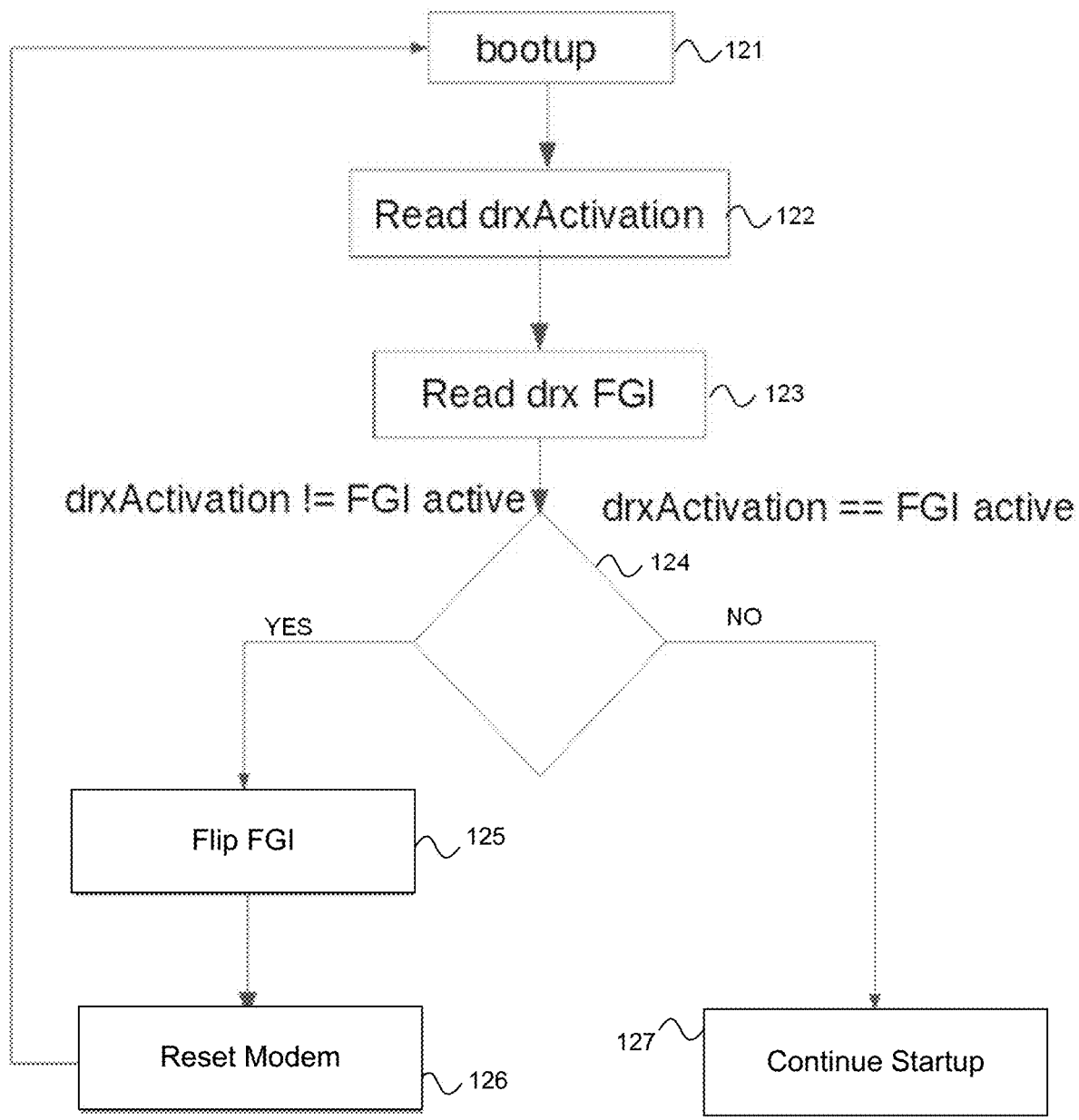
FIG. 2 illustrates a more detailed architecture of the present disclosure shown in FIG. 1.

An exemplary operational flowchart in accordance with a method of the present disclosure is illustrated in FIG. 2, which may be utilized for dynamically deactivating DRX. At block 121, a bootup sequence for one or more UEs 110 may occur. At block 122, a network device 108 (e.g., Lightweight Machine to Machine (LwM2M) of MME) may read a DRX activation bit for the one or more UEs 110 to determine whether the DRX activation bit is active or inactive. At block 123, the network node 108 may read FGI bits for the one or more UEs 110 to capabilities for the one or more UEs 110. At block 124, the network node 105 may determine whether the DRX activation bit and the FGI bits are active or at least one of the DRX activation bit or FGI bits are inactive.

If the DRX activation bit and the FGI bits are active, the method proceeds to block 127 where the bootup sequence is allowed to continue. If at least one of the DRX activation bit or FGI bits are inactive, the method proceeds to block 125 where at least one FGI bit of the FGI bits are flipped. At block 126, the modem is reset, and the method returns to block 121.

Figure 3:
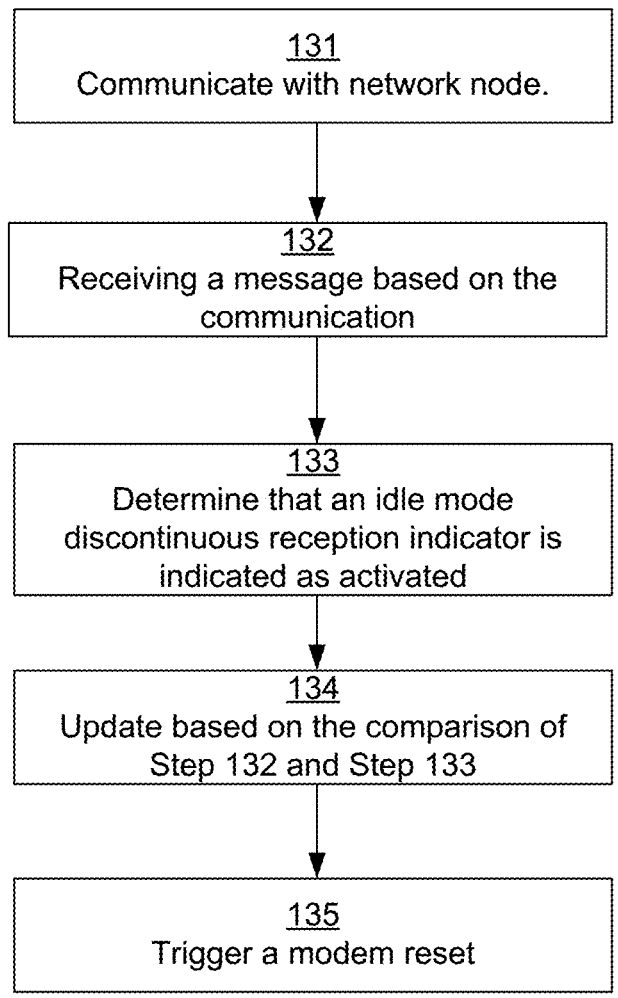
FIG. 3 represents an exemplary method flow of the present disclosure.

FIG. 3 illustrates an exemplary method for idle mode DRX on wireless devices. At step 131, UE 110 may communicate with network node 105 or any device of core network 101. The communication may be is in response to a recent powering on of UE 110. The UE 110 may send a capability information message in response to bootup (e.g., powering on), in response to a reset procedure (e.g., a modem reset), or another defined event (e.g., requesting a service). For example, in response to bootup, each of the UE 110 may be configured to identify or determine information including a defined device type or category of the UE 110 and related features supported or not supported by the UE 110.

At step 132, receiving, by UE 110, a message based on the communication. The message may include instructions indicative of commanding UE 110 to update the idle mode discontinuous reception indicator to inactive on UE 110. The message may be from a device such as MME or base station.

At step 133, determining, by UE 110, that an idle mode discontinuous reception indicator is indicated as activated on UE 110.

At step 134, based on a comparison of the message of step 132 and the idle mode discontinuous reception indicator of step 133, updating the idle mode discontinuous reception indicator to inactive on UE 110.

At step 135, in response to updating at step 134 the idle mode discontinuous reception indicator to inactive on UE 110, triggering a modem reset to force UE 110 to attach to the network with the updated new idle mode discontinuous reception indicator. Note that factors, such as type of device, latency requirements, location of device, applications on or opened on device, etc. may be used in determining whether to toggle the indicator (which may be determined by the UE side or a device of the network).

Figure 4:
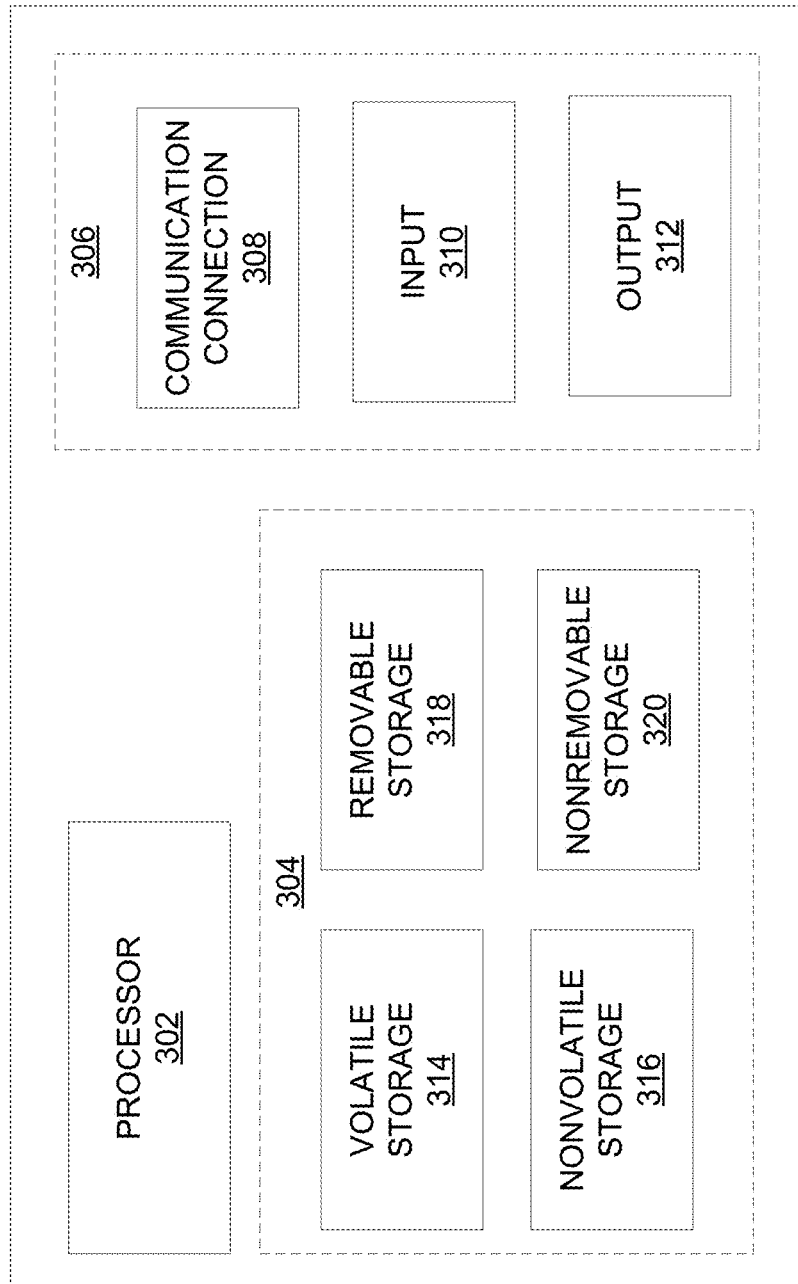
FIG. 4 illustrates a schematic of an exemplary network device.

FIG. 4 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
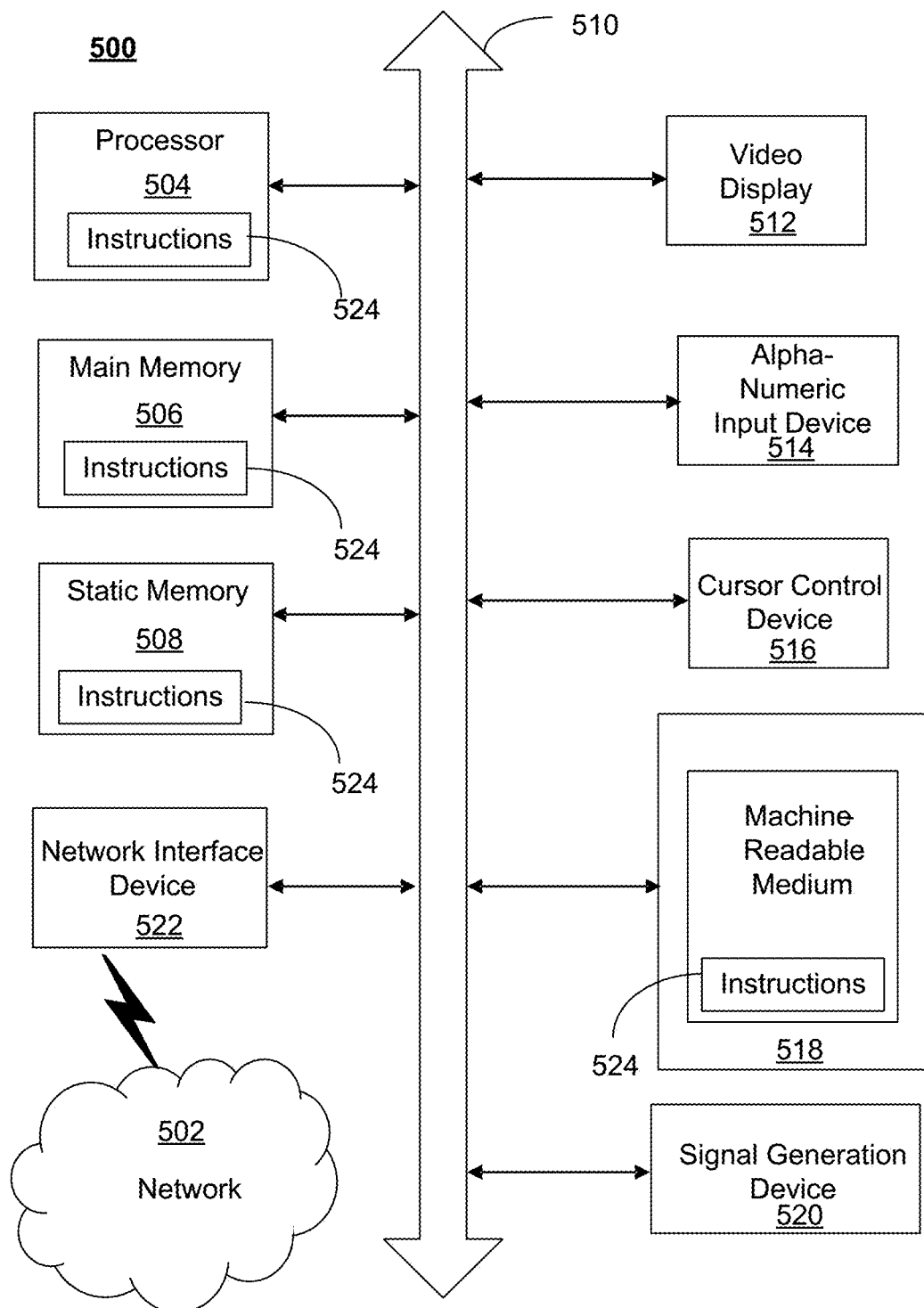
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 110, network device 108, and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which messages (e.g., alerts) can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—idle mode DRX on wireless devices—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein. The disclosed subject for idle mode may include methods for communicating, by an end device, with a communications network; based on the communication, receiving, by the end device, a message; determining, by the end device, that an idle mode discontinuous reception indicator is indicated as activate on the end device; and based on a comparison of the message and the idle mode discontinuous reception indicator being activated, updating the idle mode discontinuous reception indicator to inactive on the end device. The communicating may be in response to a recent powering on of the end device. The message may include instructions indicative of commanding the end device to update the idle mode discontinuous reception indicator to inactive on the end device. In response to updating the idle mode discontinuous reception indicator to inactive on the end device, modem reset may be triggered to force the end device to attach to the network with the updated new idle mode discontinuous reception indicator. The communicating may be in response to powering on of the end device, wherein the end device is an internet of things device. The message may be from a network device, wherein the network device is a base station. The message may be generated by a network device, the network device comprising a mobility management entity.

What is claimed:

1. A method comprising:
    updating, by an end device, an idle mode discontinuous reception indicator to inactive on the end device responsive to a comparison of a message received by the end device from a communications network with the idle mode discontinuous reception indicator being activated on the end device; and
    triggering a modem reset, by the end device, to force the end device to attach to the communications network with the idle mode discontinuous reception indicator inactive responsive to updating the idle mode discontinuous reception indicator as inactive.

2. The method of claim 1, wherein the message is received in response to a recent powering on of the end device.

3. The method of claim 1, wherein the message comprises instructions indicative of commanding the end device to update the idle mode discontinuous reception indicator to inactive on the end device.

4. The method of claim 1, wherein the message is received after powering on the end device.

5. The method of claim 1, wherein the message is from a network device, wherein the network device is a base station.

6. The method of claim 1, wherein the message is generated by a network device, the network device comprising a mobility management entity.

7. The method of claim 1, wherein the end device is an internet of things device.

8. A system comprising:
    one or more processor; and
    a memory coupled with the one or more processors, wherein the memory stores executable instructions that when executed by the one or more processors cause the one or more processors to effectuate operations comprising:
        based on a comparison of a message received by an end device and an idle mode discontinuous reception indicator being activated on the end device, updating, by the end device, the idle mode discontinuous reception indicator to inactive; and
        triggering a modem reset, by the end device, to force the end device to attach to a communications network with the idle mode discontinuous reception indicator updated to inactive responsive to updating the idle mode discontinuous reception indicator as inactive.

9. The system of claim 8, wherein the message is received responsive to a recent powering on of the end device.

10. The system of claim 8, wherein the message comprises instructions indicative of commanding the end device to update the idle mode discontinuous reception indicator to inactive on the end device.

11. The system of claim 8, wherein the end device is an internet of things device.

12. The system of claim 8, wherein the message is from a network device.

13. The system of claim 12, wherein the network device comprises a mobility management entity.

14. The system of claim 12, wherein the network device is a base station.

15. A non-transitory, computer readable storage medium storing computer executable instructions that when executed by a computing device cause said computing device to effectuate operations comprising:
    based on a comparison of a message received from a communications network by an end device and an idle mode discontinuous reception indicator being activated on the end device, updating the idle mode discontinuous reception indicator to inactive on the end device; and
    in response to updating the idle mode discontinuous reception indicator to inactive on the end device, triggering a modem reset to force the end device to attach to the communications network the idle mode discontinuous reception indicator in a new inactive state.

16. The non-transitory, computer readable storage medium of claim 15, wherein the message is received responsive to a recent powering on of the end device.

17. The non-transitory, computer readable storage medium of claim 15, wherein the message comprises instructions indicative of commanding the end device to update the idle mode discontinuous reception indicator to inactive on the end device.

18. The non-transitory, computer readable storage medium of claim 15, wherein the message is from a network device.

19. The non-transitory, computer readable storage medium of claim 18, wherein the network device is a base station or a mobility management entity.

20. The non-transitory, computer readable storage medium of claim 19, wherein the end device is an internet of things device.

* * * * *